United States Patent [19]

Gorney et al.

[11] Patent Number: 5,271,786
[45] Date of Patent: Dec. 21, 1993

[54] METHOD AND APPARATUS FOR PRODUCING PIPES FOR DRIP IRRIGATION

[75] Inventors: Moshe Gorney, Kibbutz Naan; Shlomo Galili, Tel Aviv; Dan Koren, Kibbutz Naan; Shaul Tal, Kibbutz Naan; David Sol, Kibbutz Naan, all of Israel

[73] Assignee: Naan Irrigation Systems, Kibbutz Naan, Israel

[21] Appl. No.: 774,714

[22] Filed: Oct. 9, 1991

[30] Foreign Application Priority Data

Oct. 12, 1990 [IL] Israel ................................ 95972

[51] Int. Cl.⁵ .............................................. B29C 47/02
[52] U.S. Cl. ............................ 156/229; 156/244.13; 156/244.14; 156/244.22; 156/302; 156/500; 264/172; 264/173; 264/209.5; 264/248; 425/71; 425/505; 425/113
[58] Field of Search ................... 156/165, 229, 244.11, 156/244.13–244.15, 244.22, 244.25, 244.26, 297, 299, 302, 303.1, 500; 264/172, 173, 209.3–209.5, 210.1, 211.12, 237, 248, 348; 425/71, 505, 111, 113–115

[56] References Cited

U.S. PATENT DOCUMENTS

| | | |
|---|---|---|
| 3,826,285 | 7/1974 | Reynolds . |
| 3,895,085 | 7/1975 | Suzuki et al. .................. 264/154 |
| 3,981,452 | 9/1976 | Eckstein ........................ 239/542 |
| 4,191,518 | 3/1980 | Kojimoto et al. .............. 425/467 |
| 4,473,525 | 9/1984 | Drori .............................. 264/508 |
| 4,702,787 | 10/1987 | Ruskin et al. .............. 156/244.25 |
| 4,728,042 | 3/1988 | Gorney et al. ............... 239/542 |
| 4,735,363 | 4/1988 | Shfaram et al. ............. 239/542 |
| 4,874,132 | 10/1989 | Gilead ......................... 239/542 |
| 5,022,940 | 6/1991 | Mehoudar ..................... 156/64 |

FOREIGN PATENT DOCUMENTS

| | | |
|---|---|---|
| 1544770 | 11/1971 | Australia . |
| 3304978 | 2/1978 | Australia . |
| 8497182 | 6/1982 | Australia . |
| 1276783 | 3/1983 | Australia . |
| 2902007 | 4/1980 | Fed. Rep. of Germany . |
| 1458967 | 11/1966 | France . |
| 2197713 | 3/1974 | France . |
| 2057960 | 4/1981 | United Kingdom . |

Primary Examiner—Jill L. Heitbrink
Attorney, Agent, or Firm—Darby & Darby

[57] ABSTRACT

A technique for manufacturing extruded drip irrigation lines including drip irrigation elements having a non-circular cross section including the steps of:
- extruding a drip irrigation conduit; and
- heat welding discrete drip irrigation elements having a non-circular cross section to a portion of the interior surface of the drip irrigation conduit extending over less than the entire circumference thereof, the step of heat welding including the following steps:
- sequentially feeding discrete drip irrigation elements through the interior of the drip irrigation conduit;
- causing individual drip irrigation elements to establish initial contact with the extruded conduit as the extruded conduit is being stretched to its final cross sectional dimensions; and
- completing heat welding of the elements to the conduit when the conduit has substantially reached its final cross sectional dimensions.

28 Claims, 10 Drawing Sheets

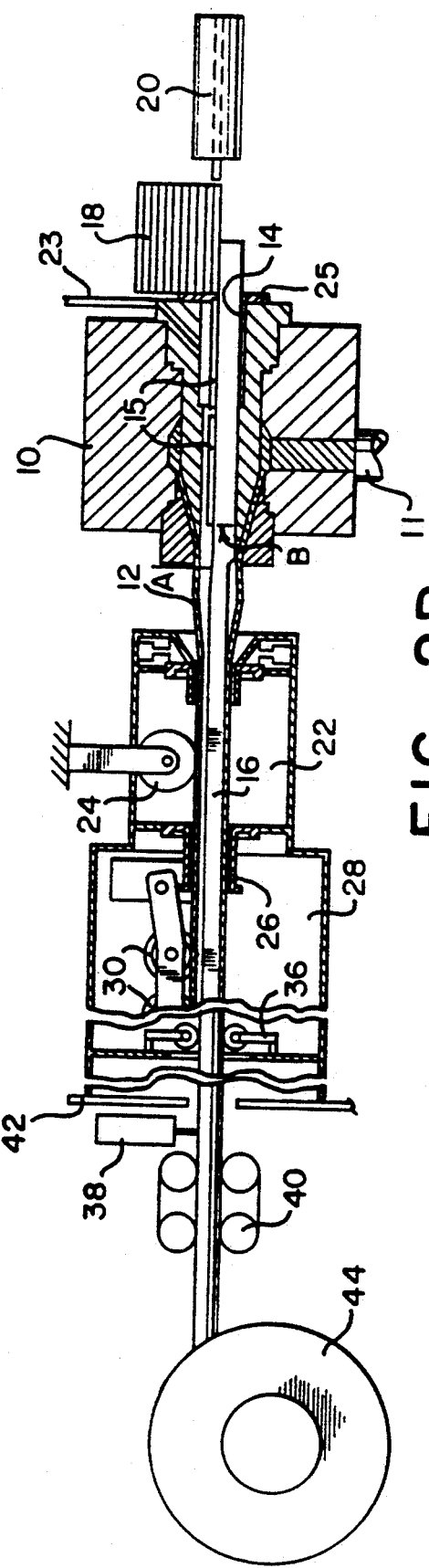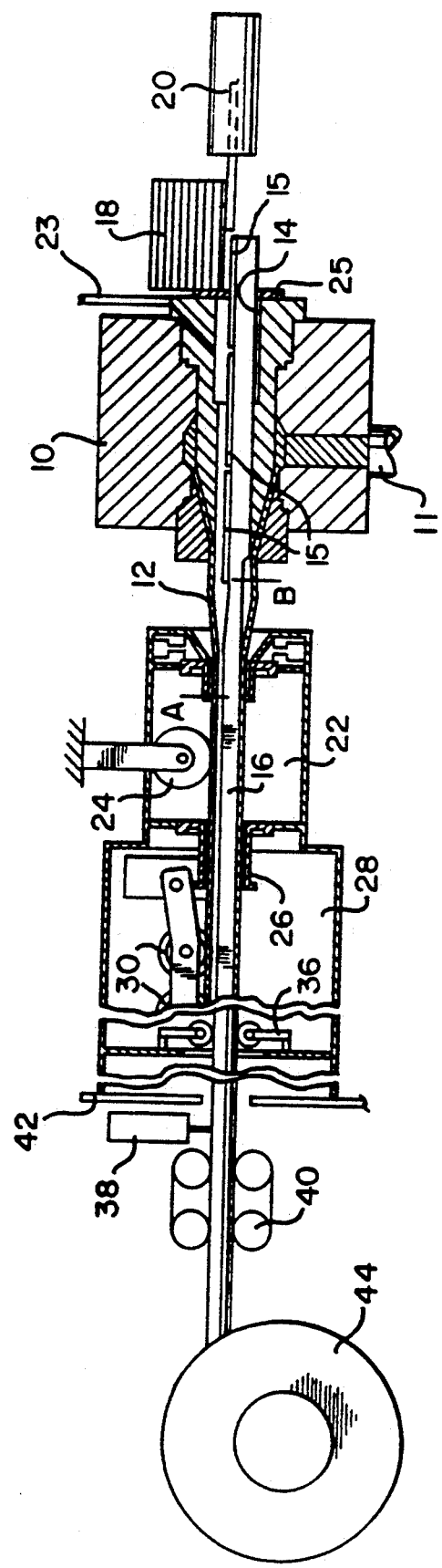

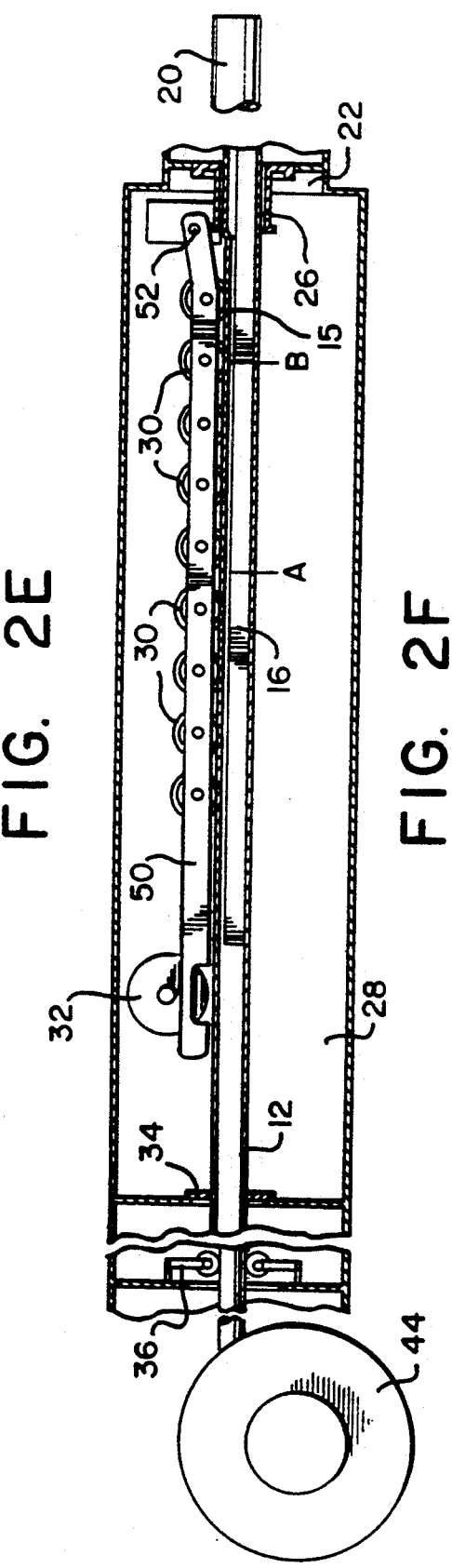
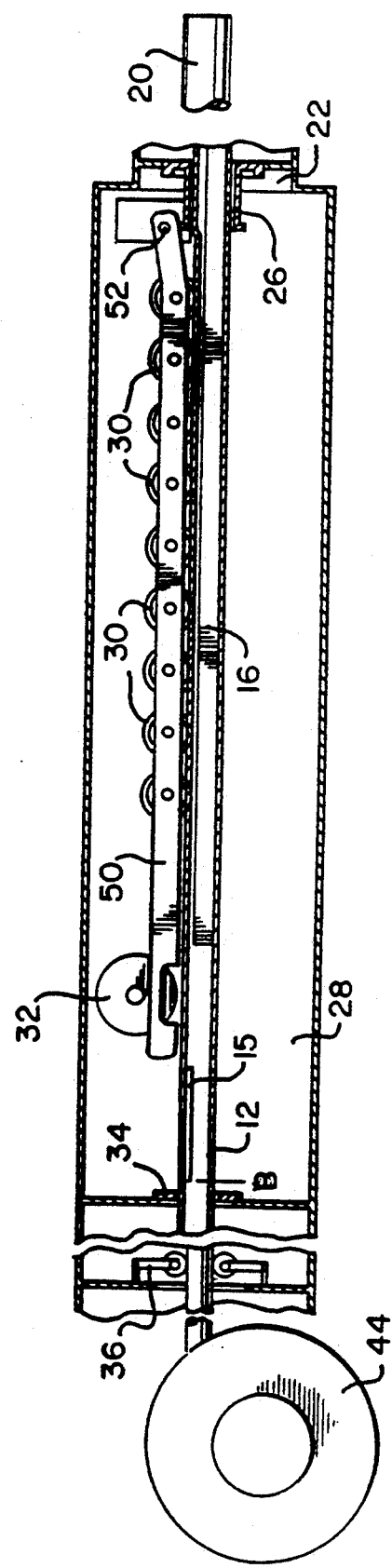

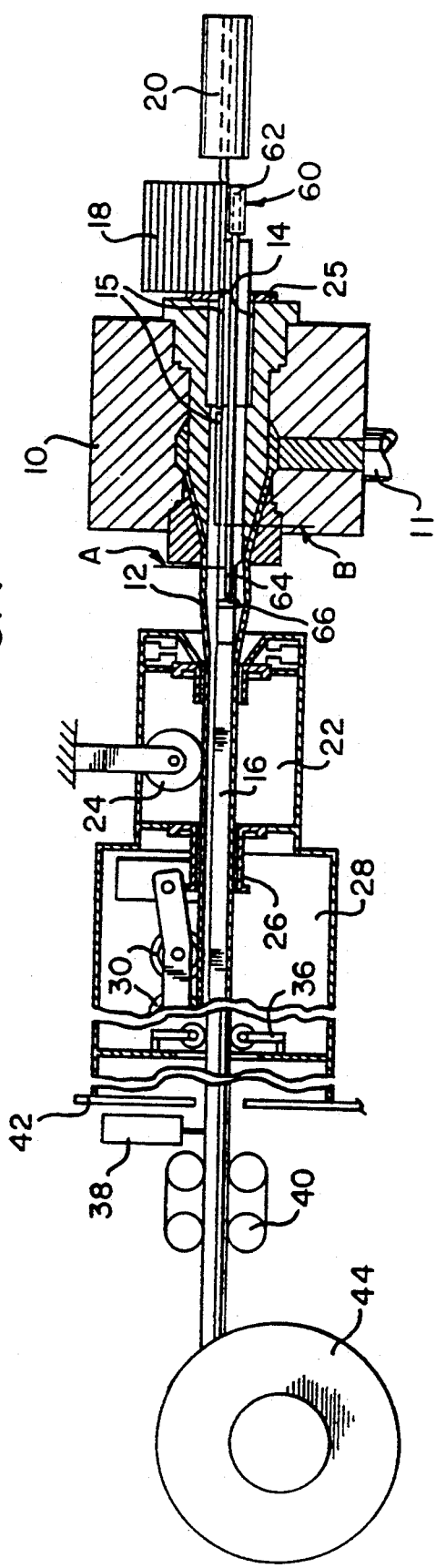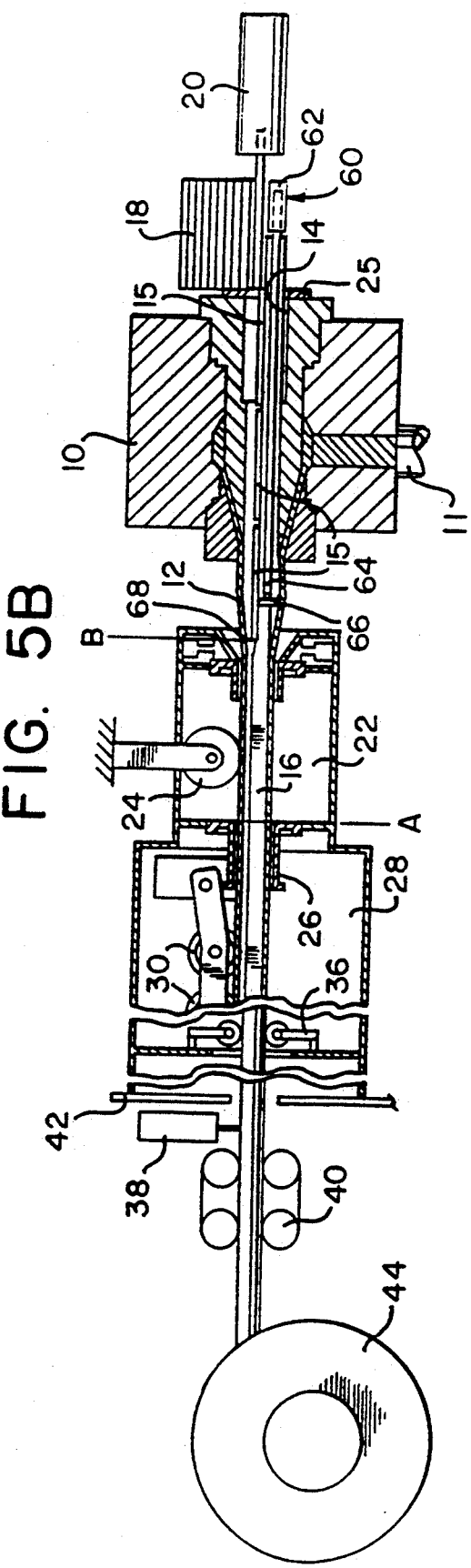

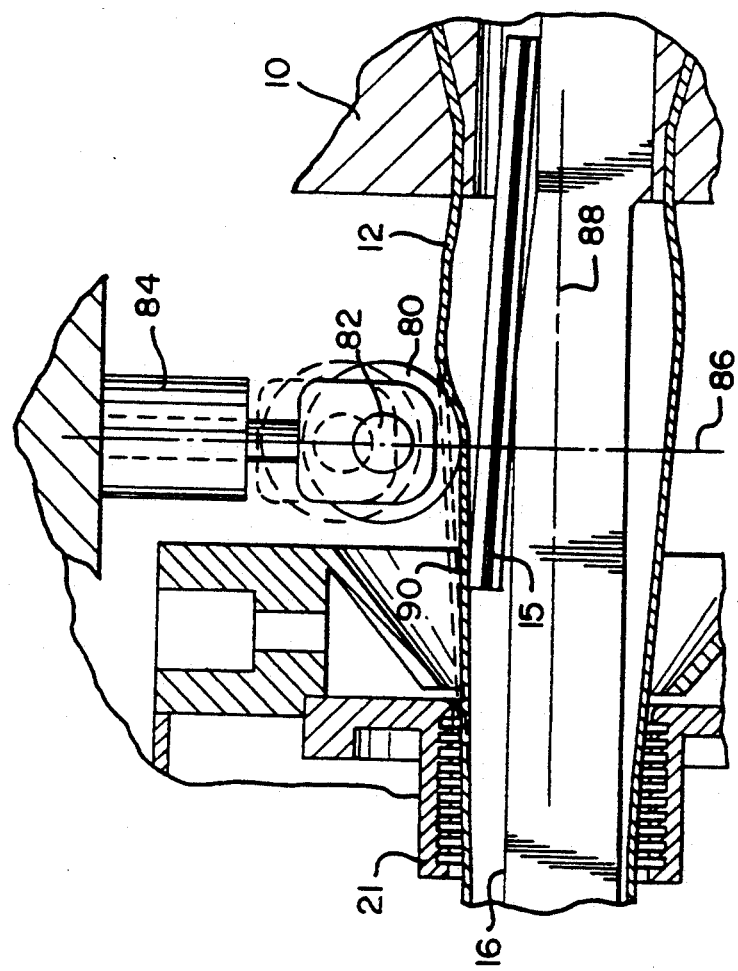
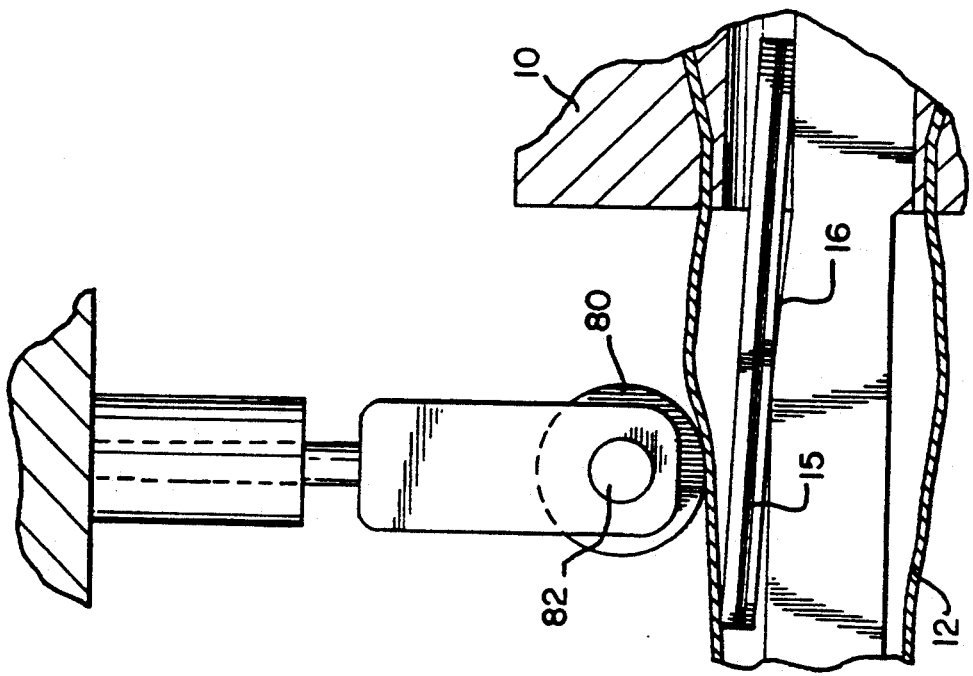

METHOD AND APPARATUS FOR PRODUCING PIPES FOR DRIP IRRIGATION

FIELD OF THE INVENTION

The present invention relates to techniques and apparatus for producing continuous extruded drip irrigation lines.

BACKGROUND OF THE INVENTION

Various types of drip irrigation emitters are known in the art and in the patent literature. U.S. Pat. No. 3,981,452 to Eckstein describes a continuous extruded drip irrigation line employing drip irrigation elements having a generally circular cross section. Drip irrigation lines according to this patent have enjoyed considerable commercial success throughout the world.

Beginning in 1979, drip irrigation conduits were introduced to the market which employed drip irrigation elements having a non-circular circular cross section heat welded to the interior surface of an extruded conduit.

U.S. Pat. No. 4,728,042 to Gorney and Dinur, describes a continuous extruded drip irrigation line wherein the drip irrigation elements have a non-circular cross section and are mounted onto the interior wall of an extruded drip irrigation conduit along less than its entire circumference. A flow rate reduction path is defined between the interior wall and part of each element.

SUMMARY OF THE INVENTION

The present invention seeks to provide a new technique for manufacture of extruded drip irrigation lines including drip irrigation elements having a non-circular cross section, mounted onto the interior wall of an extruded drip irrigation conduit along less than its entire circumference.

There is thus provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit;

causing individual drip irrigation elements to establish initial contact with the extruded conduit as the extruded conduit is being stretched to its final cross sectional dimensions; and completing heat welding of the elements to the conduit when the conduit has substantially reached its final cross sectional dimensions.

There is also provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit; and causing individual drip irrigation elements to establish initial contact with the extruded conduit while the extruded conduit has a linear velocity less than its final linear velocity.

There is also provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit; an causing individual drip irrigation elements to establish initial contact with the extruded conduit as the extruded conduit is undergoing linear motion at a first velocity substantially greater than the velocity of the individual drip irrigation element.

Additionally, the technique may include the step of pulling, by means of the initial contact, the drip irrigation element together with the conduit until heat welding is completed.

In accordance with a preferred embodiment of the invention, the velocity of the drip irrigation element upon initial contact is at least 20% less than the first velocity.

In accordance with another preferred embodiment of the invention, the velocity of the drip irrigation element upon initial contact is at least 50% less than the first velocity.

In accordance with a preferred embodiment of the invention, the velocity of the drip irrigation element upon initial contact is nearly zero.

There is additionally provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the steps of heat welding including the following steps:

sequentially feeding discrete drip irrigation elements through the interior of the drip irrigation conduit; and causing individual drip irrigation elements to establish heat welding contact with the extruded conduit as the extruded conduit is undergoing linear motion at a first velocity, said step of causing comprising moving the individual drip irrigation element with a component of motion transverse to the linear motion of the extruded conduit and into contact with an interior surface thereof.

There is further provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit; and causing individual drip irrigation elements to establish heat welding contact with the extruded conduit as the extruded conduit is undergoing linear motion at a first velocity, said step of causing comprising pushing the extruded conduit with a component of motion transverse to the linear motion thereof and into contact with an individual drip irrigation element.

There is additionally provided in accordance with a preferred embodiment of the present invention a technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit; and causing individual drip irrigation elements to establish heat welding contact with the extruded conduit as the extruded conduit is undergoing linear motion, said step of causing comprising the steps of:

supplying gas under pressure to the interior of the extruded conduit, thereby causing expansion thereof;

stretching the expanded extruded conduit to cause contraction thereof as initial heat welding contact is established between the drip irrigation element and the extruded conduit.

Additionally in accordance with a preferred embodiment of the invention there is provided apparatus for manufacturing extruded drip irrigation lines including drip irrigation elements having a non-circular cross section comprising:

apparatus for extruding a drip irrigation conduit; and apparatus for heat welding discrete drip irrigation elements having a non-circular cross section to a portion of the interior surface of the drip irrigation conduit extending over less than the entire circumference thereof, the apparatus for heat welding comprising:

apparatus for sequentially feeding discrete drip irrigation elements through the interior of the drip irrigation conduit;

apparatus for causing individual drip irrigation elements to establish initial contact with the extruded conduit as the extruded conduit is being stretched to its final cross-sectional dimensions; and apparatus for completing heat welding of the elements to the conduit when the conduit has substantially reached its final cross sectional dimensions.

Additionally in accordance with a preferred embodiment of the invention there is provided apparatus for manufacturing extruded drip irrigation lines including drip irrigation elements having a non-circular cross section comprising:

apparatus for extruding a drip irrigation conduit; and apparatus for heat welding discrete drip irrigation elements having a non-circular cross section to a portion of the interior surface of the drip irrigation conduit extending over less than the entire circumference thereof, the means for heat welding comprising:

apparatus for sequentially feeding discrete drip irrigation elements through the interior of the drip irrigation conduit; and apparatus for causing individual drip irrigation elements to establish initial contact with the extruded conduit as the extruded conduit is undergoing linear motion at a first velocity substantially greater than the velocity of the individual drip irrigation element, whereby by means of the initial contact, the drip irrigation element is pulled together with the conduit until heat welding is completed.

The velocity of the drip irrigation element upon initial contact is preferably at least 20% less than the first velocity, and may be at least 50% less than the first velocity or nearly zero.

Further in accordance with an embodiment of the invention there is provided apparatus for manufacturing extruded drip irrigation lines including drip irrigation elements having a non-circular cross section comprising:

apparatus for extruding a drip irrigation conduit; and apparatus for heat welding discrete drip irrigation elements having a non-circular cross section to a portion of the interior surface of the drip irrigation conduit extending over less than the entire circumference thereof, the apparatus for heat welding comprising:

apparatus for sequentially feeding discrete drip irrigation elements through the interior of the drip irrigation conduit; and apparatus for causing individual drip irrigation elements to establish heat welding contact with the extruded conduit as the extruded conduit is undergoing linear motion at a first velocity, said step of causing comprising moving the individual drip irrigation element with a component of motion transverse to the linear motion of the extruded conduit an into contact with an interior surface thereof.

Additionally in accordance with an embodiment of the invention there is provided apparatus for manufacturing extruded drip irrigation lines including drip irrigation elements having a non-circular cross section comprising:

apparatus for extruding a drip irrigation conduit; and apparatus for heat welding discrete drip irrigation elements having a non-circular cross section to a portion of the interior surface of the drip irrigation conduit extending over less than the entire circumference thereof, the apparatus for heat welding comprising:

apparatus for sequentially feeding discrete drip irrigation elements through the interior of the drip irrigation conduit; and apparatus for causing individual drip irrigation elements to establish heat welding contact with the extruded conduit as the extruded conduit is undergoing linear motion at a first velocity, said means for causing comprising means for pushing the extruded conduit with a component of motion transverse to the linear motion thereof and into contact with an individual drip irrigation element.

Still further in accordance with an embodiment of the invention there is provided apparatus for manufacturing extruded drip irrigation lines including drip irrigation elements having a non-circular cross section comprising:

apparatus for extruding a drip irrigation conduit; and apparatus for heat welding discrete drip irrigation elements having a non-circular cross section to a portion of the interior surface of the drip irrigation conduit extending over less than the entire circumference thereof, the apparatus for heat welding comprising:

apparatus for sequentially feeding discrete drip irrigation elements through the interior of the drip irrigation conduit; and apparatus for causing individual drip irrigation elements to establish heat welding contact with the extruded conduit as the extruded conduit is undergoing linear motion, the step of causing comprising:

apparatus for supplying gas under pressure to the interior of the extruded conduit, thereby causing expansion thereof; and apparatus for stretching the expanded extruded conduit to cause contraction thereof as initial heat welding contact is established between the drip irrigation element and the extruded conduit.

Preferably the apparatus for heat welding comprise a series of rollers arranged to externally engage the conduit following initial heat welding contact thereof with the drip irrigation elements, for assisting in the completion of heat welding therebetween. The series of rollers are preferably arranged for engagement with said conduit within a liquid bath maintained at less than atmospheric pressure.

The apparatus for heat welding may also include at least one roller disposed for external engagement with the conduit upstream of said series of rollers, for ensuring alignment of the drip irrigation elements with the conduit.

Preferably the said series of rollers is formed with a concave cross section arranged to correspond to the shape of the conduit and the drip irrigation elements, thereby to ensure complete heat welding therebetween. Alternatively the series of rollers is formed to define a straight engagement surface for engagement with the conduit. Preferably the series of rollers is operative to configure the conduit to correspond to the shape of the drip irrigation elements, at the location of each drip irrigation element.

There may also be provided a roller externally engaging the conduit at a location just upstream of the location of initial contact between the conduit and the drip irrigation emitter.

The heat welding apparatus may include a drip irrigation emitter unit support which is non-linear. More specifically, a preferred emitter unit support includes an initial upward bend followed by a downward bend, both bends lying upstream of the location of initial contact between the conduit and the drip irrigation emitter.

There may also be provided roller apparatus for flattening the conduit following heat welding of drip irrigation emitters thereto.

In accordance with an embodiment of the invention there is provided drip irrigation apparatus manufactured according to the technique described above or using the apparatus described above.

BRIEF DESCRIPTION OF THE DRAWINGS

The present invention will be understood and appreciated more fully from the following detailed description, taken in conjunction with the drawings in which:

FIGS. 2A, 2B, 2C, 2D, 2E and 2F illustrate six stages in a technique for manufacturing a continuous drip irrigation line in accordance with a preferred embodiment of the present invention;

FIGS. 5A, 5B and 5C illustrate three stages in a technique for manufacturing a continuous drip irrigation line in accordance with another preferred embodiment of the present invention;

FIG. 8 is an enlarged illustration corresponding to FIG. 7 for one set of operating parameters;

FIG. 10 is an enlarged illustration corresponding to FIG. 7 for yet another set of operating parameters.

DETAILED DESCRIPTION OF PREFERRED EMBODIMENTS

Figure 1:
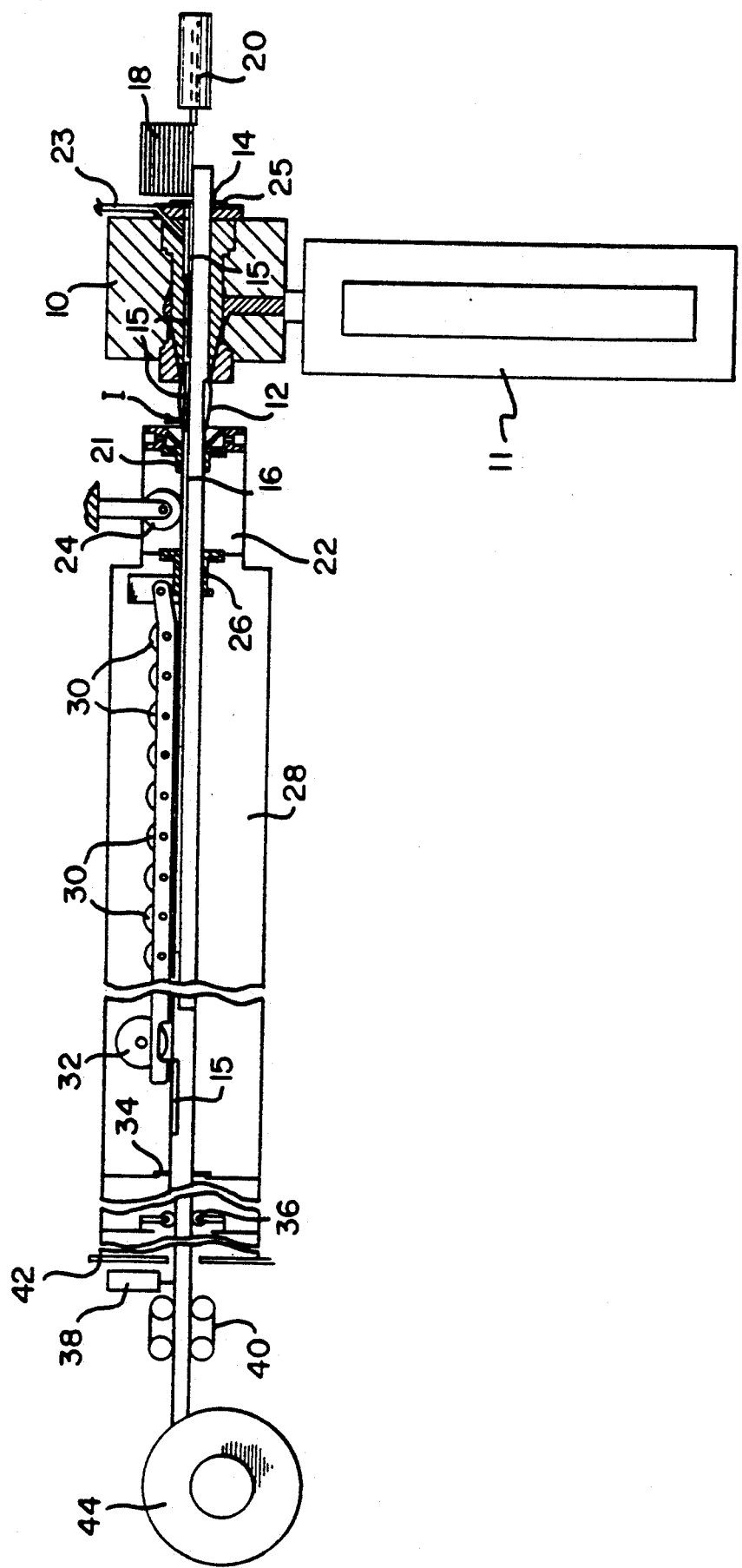
FIG. 1 is a general illustration of apparatus for carrying out a technique for manufacturing a continuous drip irrigation line in accordance with a preferred embodiment of the present invention.

Reference is now made to FIG. 1, which illustrates apparatus for producing a drip irrigation line and FIGS. 2A-2F, which illustrate portions of the apparatus of FIG. 1 in greater detail and enable an understanding of the process, according to the present invention, whereby drip irrigation lines are produced.

Generally speaking, the apparatus of FIGS. 1 and 2A-2F comprises an extrusion head 10 and associated extruder 11, which produce an extruded conduit 12. The extrusion head is designed so as to define a bore 14 therein, through which drip irrigation emitter units 15 are supplied to the interior of extruded conduit 12 on a support track 16 from a stack 18, by means of a pushing mechanism 20. The pushing mechanism may comprise a piston undergoing back and forth motion or alternatively a driving mechanism which only moves in one direction. The driving mechanism may stop intermittently but preferably provides continuous motion at a speed less than the speed of conduit 12. The speed may be adjusted to achieve a desired distance between drip irrigation emitters, while the continuous motion ensures that this distance remains constant throughout.

In accordance with one embodiment of the present invention, illustrated in FIG. 1, a passage 23 is provided in extrusion head 10 and in communication with bore 14 for supply of gas under positive pressure to the interior of the conduit 12. Suitable pressure sealing 25 of the bore 14 may be provided as appropriate. Alternatively passage 23 may be eliminated.

Initial contact of the drip irrigation emitter units 15 with the conduit 12 occurs downstream of the extrusion head 10 at a location I intermediate the extrusion head 10 and a first labyrinth seal 21 which defines the upstream boundary of a cooling water bath 22, which is typically maintained at a positive pressure with respect to the ambient. Alternatively, the cooling water bath 22 may be maintained under vacuum.

Provision of gas under positive pressure to the interior of the conduit 12 provides enhanced expansion of the conduit 12, just downstream of the extrusion head 10 and allows bath 22 to be maintained at a higher positive pressure than would otherwise be possible without causing collapse of the conduit therein.

Within the bath 22, the conduit 12 is engaged by a roller 24, which is spaced at a predetermined separation from track 16, in order to line up the conduit 12 with respect to emitters 15 for efficient heat welding therebetween, downstream of roller 24.

The conduit 12 passes a second labyrinth seal 26, which defines the downstream boundary of bath 22 and enters a second water bath 28, which is preferably maintained at a pressure below that of bath 22 and is typically maintained under vacuum.

Within bath 28, the conduit 12 passes in engagement with a series of rollers 30, which serve to finalize heat welding of the emitter units 15 onto the interior surface of conduit 12. The separation of rollers 30 from track 16 is determined by a spacer roller assembly 32.

The conduit 12 exits bath 28 via a seal 34, which may be a labyrinth seal, but need not be, in view of the fact that at this stage the conduit 12 has relatively fixed dimensions due to cooling thereof. Downstream of bath 28, the conduit may be passed through additional cooling baths. The conduit 12 may be flattened by one or more pair of rollers 36 and outlet apertures are formed therein by apparatus 38. Rollers 36 may be located at any suitable location along the production line and may be located within a cooling bath.

Alternatively, any or all of rollers 24, 30, 36 may be replaced by a flat pressure surface.

Apparatus 38 typically comprises apparatus for physically sensing the presence of an emitter unit 15 in a flattened conduit 12. Such apparatus may employ aperturing means which are mounted onto the apparatus for physically sensing for moving together therewith and together with the emitter unit until aperturing occurs. Alternatively, the aperturing means need not move together with the emitter unit but instead have its motion synchronized with the motion of the emitter unit according to the known speed of the emitter unit. In such a case, the motion of the aperturing means need not be linear, but could be in an arc.

Movement of the conduit through the various stages described hereinabove is accomplished by means of a caterpillar drive assembly 40, whose speed is synchronized with the extrusion speed of extruder 11, such that the speed at which the conduit 12 is pulled by drive assembly 40 is typically about 1.5 times the speed at which the conduit 12 leaves the extruder head 10, thereby producing stretching and reduction of the diameter of the conduit 12 as it cools and progresses through the various stages described hereinabove.

There is preferably provided apparatus 42 for measuring the diameter of conduit 12 upstream of drive assembly 40. In response to the sensed diameter of the conduit, either or both of the speed of drive assembly 40 and extruder 11 are continuously adjusted to provide the desired uniform diameter of conduit 12. In this manner, the use of a calibrator, as in the prior art, is obviated.

A power driven take up reel 44 winds the completed drip irrigation line.

Reference is now made to FIGS. 2A–2F which illustrate in greater detail various portions of the apparatus of FIG. 1.

FIG. 2A illustrates the apparatus of FIG. 1 as the conduit 12 is being extruded from the head 10 at a linear speed of typically 40 meters/second and the emitters 15 are at rest. Reference A indicates the location of a given location on conduit 12 at a point in time when the leading edge B of an emitter unit 15 is about to be pushed forward by pushing mechanism 20.

FIG. 2B illustrates the relative progress of the conduit 12 and the emitter unit 15 in a linear direction after elapse of a given time from the stage shown in FIG. 2A. It is seen that the linear displacement of A is significantly greater than the linear displacement of B, indicating that the linear speed of the emitter unit is significantly less than that of conduit 12. Typically the steady state linear speed of emitter unit 15, when driven by pushing mechanism 20, is about 20 meter/second.

Figure 2C:
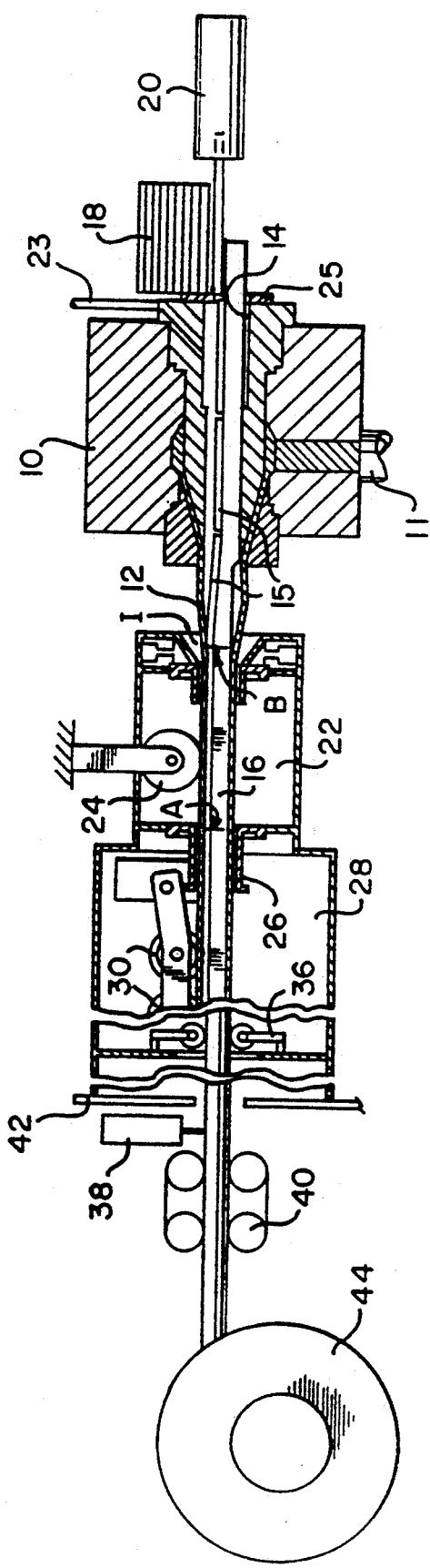

FIG. 2C illustrates initial contact between the leading edge B of emitter unit 15 and conduit 12. A consideration of FIGS. 2A, 2B and 2C indicates clearly that upon initial contact between the emitter unit 15 and conduit 12, the conduit 12 has a linear speed which is significantly greater than the linear speed of the emitter unit 15. A typical ratio between the linear speed of the conduit 12 and of the emitter unit 15 is 1.5.

By virtue of the initial contact between the conduit 12 and the emitter unit 15 and adhesion therebetween, the conduit 12 pulls the emitter unit 15 along therewith at the linear speed of the conduit. It is understood that movement of the emitter unit 15 up to the stage illustrated in FIG. 2C is provided by pushing mechanism 20, while movement of the emitter unit 15 after the stage illustrated in FIG. 2C is provided generally by the conduit 12 by virtue of the contact between the conduit and the emitter unit.

It is appreciated that both before and after the initial contact stage illustrated in FIG. 2C, the conduit 12 is being stretched as described above. As the result of this stretching, the linear speed of the location A on the conduit increases as it moves away from the extrusion head and continues to increase until well after the stage of initial contact.

Figure 3:
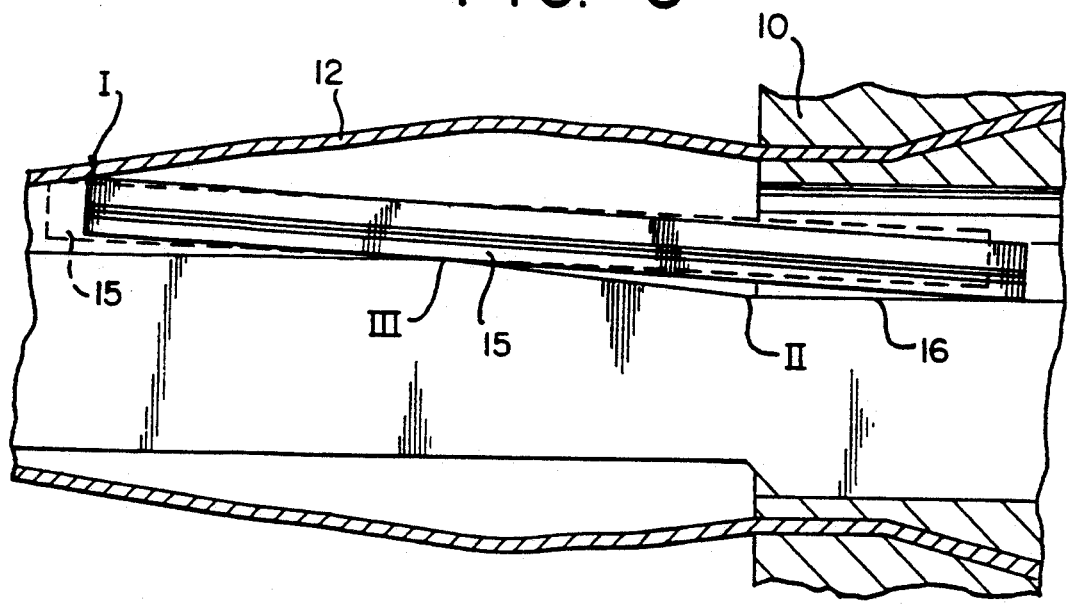
FIG. 3 is a detailed illustration of a portion of the technique illustrated in FIGS. 2A-2F.

In accordance with a preferred embodiment of the invention, and as illustrated in FIG. 3, track 16 is bent upward at a location II and levels out at a location III intermediate the head 10 and location I in order to bring the emitter units 15 passing therealong into closer propinquity to the adjacent inner surface of conduit 12 prior to initial contact. Specifically the locations II and III are located with respect to location I, such that when the leading edge of the emitter unit reaches location I, the emitter is angled upwardly with respect to the longitudinal axis of the conduit 12, as illustrated in solid lines in FIG. 3 and is free to rotate about an axis transverse to the longitudinal axis upon establishment of initial contact, to an orientation shown in dashed lines in FIG. 3, thereby reducing the chance of damage to the conduit 12 as the result of initial contact between the conduit 12 and the emitter unit 15 at different linear speeds.

Figure 2D:
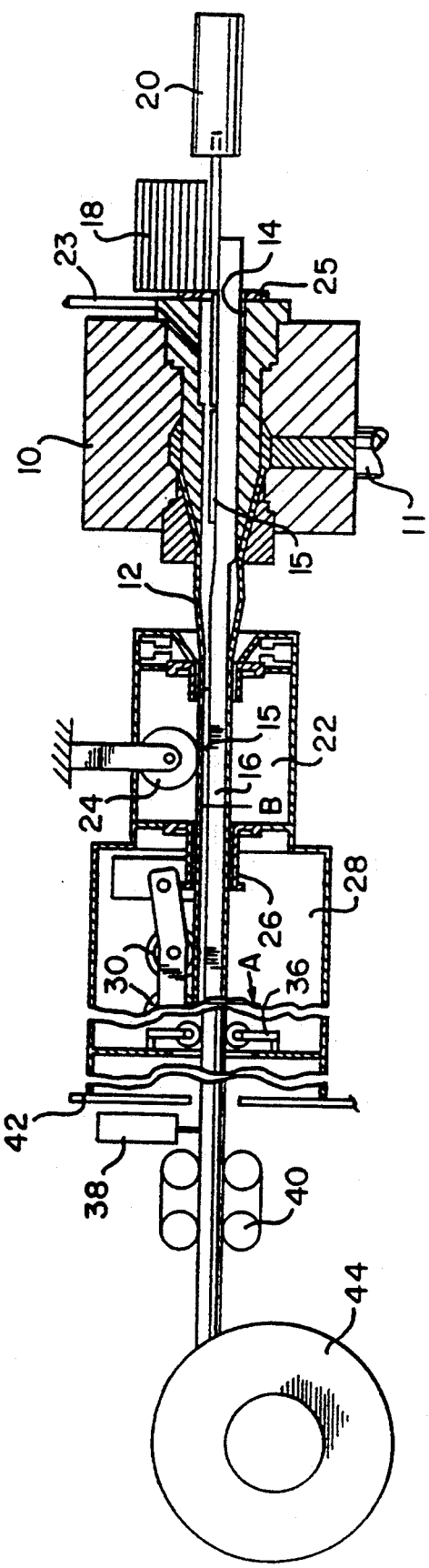

Following initial contact, as illustrated in FIG. 2C, the conduit 12, pulling with it the emitter 15, passes through labyrinth seal 21 and into bath 22, as illustrated in FIG. 2D. It is noted that labyrinth seal 21 does not operate to determine the dimensions of the conduit 12 nor does it operate to force the conduit 12 and emitter unit 15 into heat welding engagement.

Figure 4:
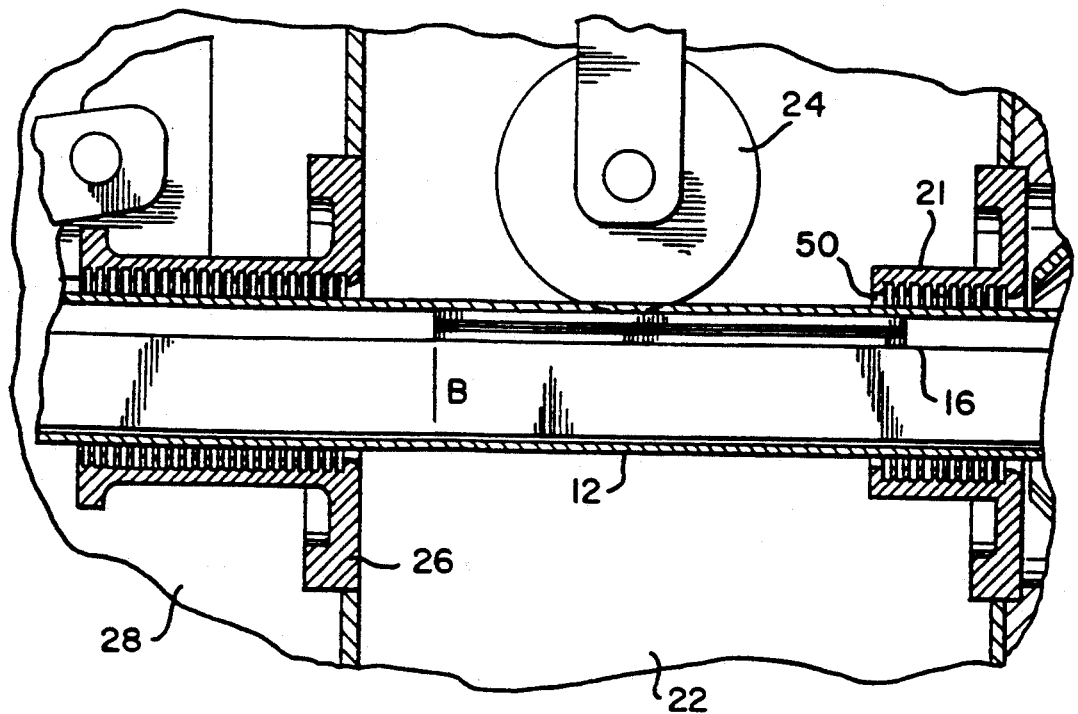
FIG. 4 is a detailed illustration of another portion of the technique illustrated in FIGS. 2A-2F.

Reference is made in this connection to FIG. 4, which is an enlarged illustration of bath 22 and labyrinth seals 21 and 26. It is seen that a gap 50 is defined between the teeth of the labyrinth seal 21 and the outer surface of conduit 12. As noted above, roller 24 is spaced at a predetermined separation from track 16, in order to line up the conduit 12 with respect to emitter units 15 for efficient heat welding therebetween, downstream of roller 24.

The conduit 12, carrying with it emitter unit 15, which continues to be supported on track 16, leaves bath 22 via labyrinth seal 26 As shown in FIG. 2E, the conduit 12 enters bath 28 and passes in operative engagement with series of rollers 30 which function to complete the heat welding of the emitter unit 15 to the interior surface of conduit 12

The series of rollers 30 preferably is supported on side brackets 50, which are pivotably mounted at one end about a pivot axis 52. The separation of the series of rollers 30 may be adjusted by means of a spacer roller assembly 32, located at the opposite end of side brackets 50 from pivot axis 52. It is appreciated that the number of rollers may be increased or decreased from the number illustrated in the drawings, as suitable for a given operating speed. The series of rollers 30 provides a controlled force externally of conduit 12, urging it into contact along the length of drip irrigation emitter unit 15.

FIG. 2F illustrates a stage wherein an emitter unit 15 has passed the series of rollers 30 and is fully heat welded to the inside surface of conduit 12.

Figure 5C:
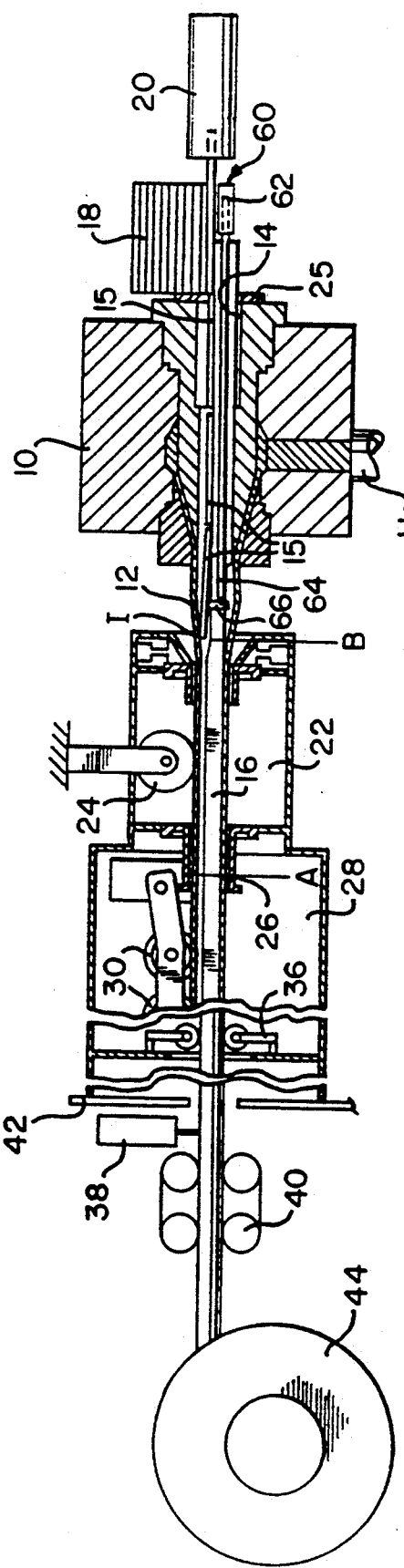

Reference is now made to FIGS. 5A-5C, which illustrate three stages in the production of drip irrigation lines in accordance with the present invention, corresponding generally to the stages shown in FIGS. 2A-2C and described above.

FIG. 5A illustrates an initial stage corresponding to that shown in FIG. 2A. The difference here is the provision of a transverse displacement assembly 60 including a drive piston and cylinder 62, an extension rod 64, arranged for axial motion parallel to the axis of the conduit 12, and an emitter unit engagement portion 66 Engagement portion 66 is located adjacent the extreme end of extension rod 64, opposite from piston and cylinder 62 and is arranged to be raised by engagement therewith by the extreme end of the extension rod 64.

As shown in FIG. 5B, the conduit 12 and emitter unit 15 move axially to respective axial positions corresponding to those shown in FIG. 2C. Here, however, the emitter unit 15 does not yet engage the inner surface of the conduit and is axially at rest prior to engaging the inner surface of the conduit. In practice, termination of the axial velocity of the emitter 15 may be achieved by provision of a stop 68, although a stop 68 is not required for this purpose.

Figure 6:
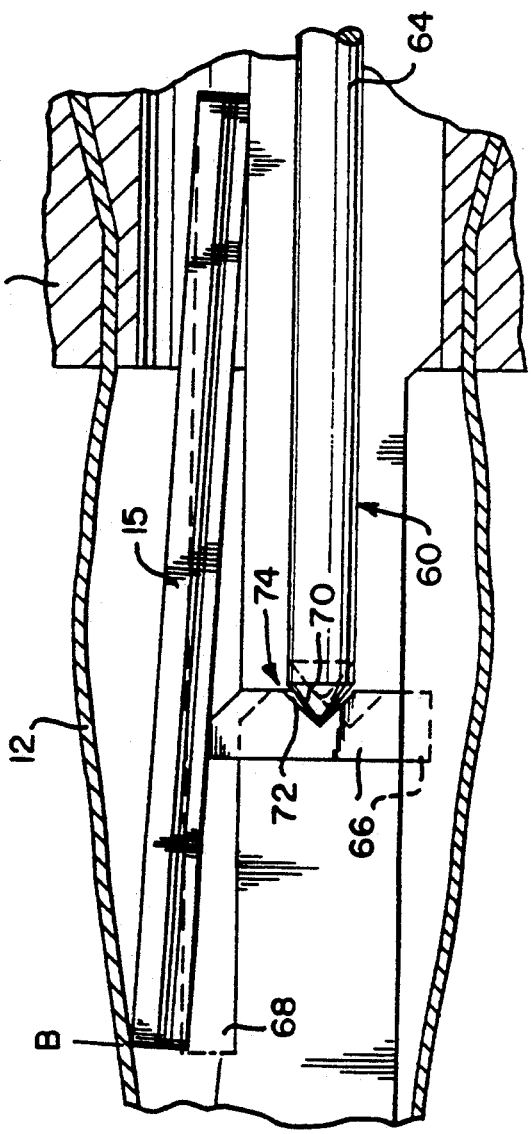
FIG. 6 is an enlarged illustration of the stages shown in FIGS. 5B and 5C.

As illustrated in detail in FIG. 6, once emitter unit 15 comes to rest at the location illustrated in FIG. 5B, the transverse displacement assembly 60 is operative to extend rod 64 so that the inclined tip 70 of rod 64 engages a suitably inclined cam surface 72 of a recess 74 in engagement portion 66, thereby raising engagement portion 66 in a direction generally transverse to the longitudinal axis of conduit 12 and urging the leading edge B of emitter unit 15 into engagement with the inner surface of conduit 12.

For ease in understanding FIG. 6, the orientations of elements 64, 66 and 15 prior to transverse displacement, as shown in FIG. 5B, are illustrated in dashed lines, while the orientations of elements 64, 66 and 15 following transverse displacement, as shown in FIG. 5C, are illustrated in solid lines.

Figure 7:
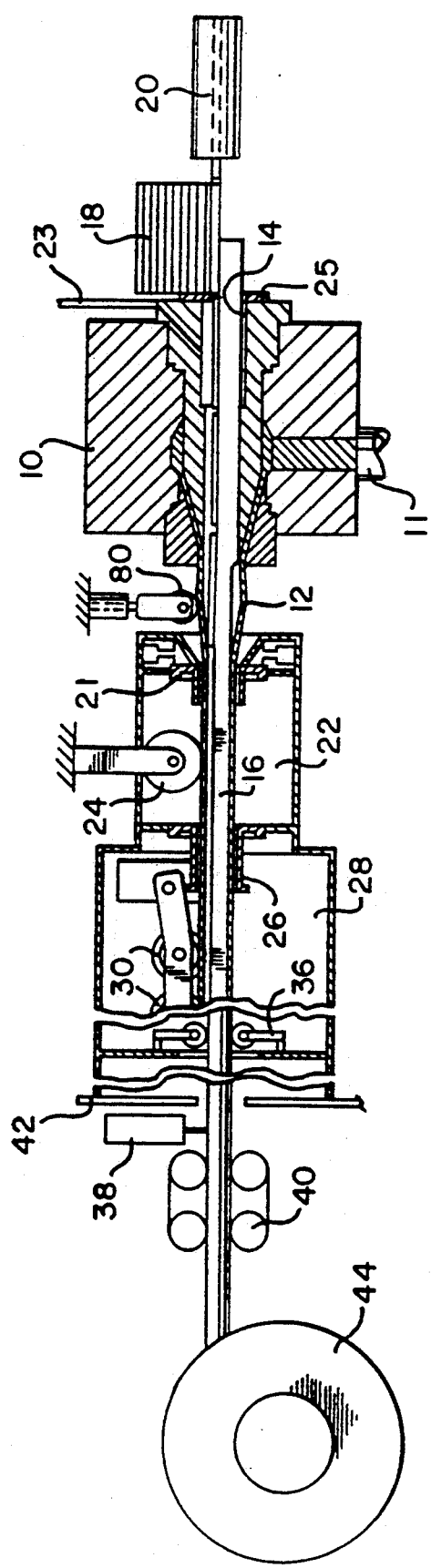
FIG. 7 is an illustration generally corresponding to FIG. 2C for a technique which is slightly modified as compared with the technique illustrated in FIG. 2C.

Reference is now made to FIG. 7, which illustrates apparatus for producing a drip irrigation line which is slightly modified as compared with the apparatus illustrated in FIG. 1. Here an additional roller 80 is provided for engagement with conduit 12 downstream of the exit from the extrusion head 10 and upstream of the labyrinth seal 21. Roller 80 may be rotatably mounted for rotation about a fixed axis or alternatively may be mounted for both rotation and translation along an axis extending perpendicular to the direction of movement of the conduit 12, as will be described hereinbelow with respect to FIG. 10. The remainder of the apparatus of FIG. 7 may be identical to that shown in FIG. 1.

FIG. 7 illustrates a stage in the production of the drip irrigation line which corresponds generally to that illustrated in FIG. 2C and in FIG. 3. FIG. 8 is an enlarged illustration which corresponds to the stage illustrated in solid lines in FIG. 3. From a comparison of FIGS. 3 and 8, it can be seen that the provision of roller 80 reduces the acute angle between the inner surface of the conduit 12 and the top surface of the insert 15 at the location of initial engagement.

Figure 9:
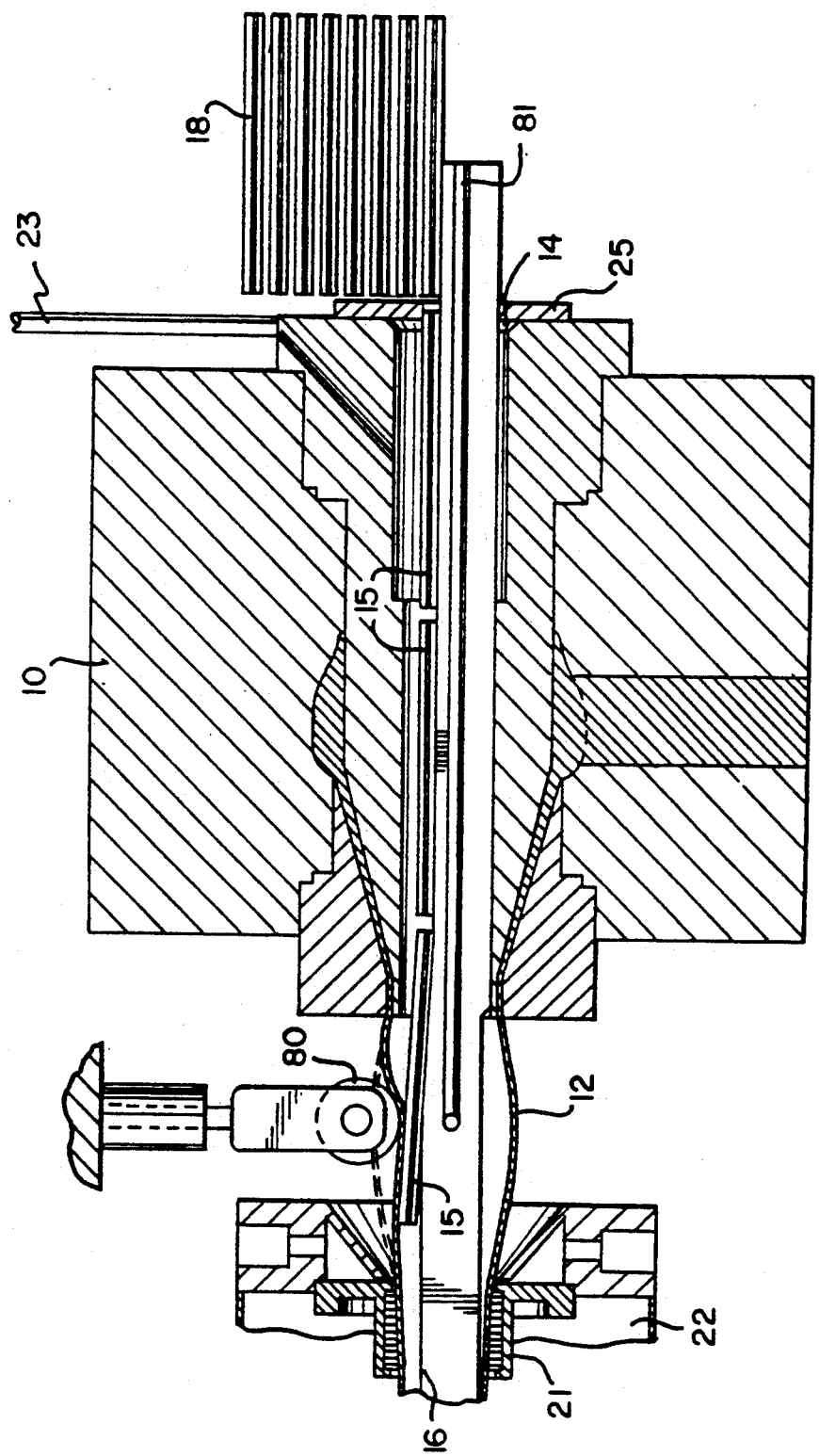
FIG. 9 is an enlarged illustration generally corresponding to FIG. 7 for another set of operating parameters.

FIG. 9 is an enlarged illustration corresponding generally to FIG. 7 but illustrating somewhat different apparatus for producing a drip irrigation line. In the embodiment of FIG. 9, pressurized air or other gas is provided to the interior of the conduit 12, from an external source via at least one of two passages 23 and 81. It is noted that passage 23, which passes through the extrusion head 10, tends to heat the gas passing therethrough, while passage 81, which passes through bore 14, tends not to heat the gas to the same extent The arrangement of bore 81 enables the gas outlet to be relatively further downstream than the gas outlet from passage 23. Alternatively, only one of passages 23 and 81 may be employed.

The arrangement of FIG. 9 provides inflation of the conduit 12 immediately after its exit from the extrusion head 10. Cooperating action of roller 80 causes the initial contact between the conduit 12 and an emitter unit 15 to be a generally area contact. Alternatively roller 80 may be eliminated.

Reference is now made to FIG. 10, which illustrates an alternative technique for producing a drip irrigation line using the apparatus of FIG. 7. Here, roller 80 is rotatably mounted on an axle 82, which is in turn mounted on a linear displacer assembly 84, such as a piston and cylinder combination, arranged for translation along an axis 86 generally perpendicular to the axis 88 of the conduit 12 as it passes through the apparatus of FIG. 7. Linear displacer assembly 84 is operative to provide selectable positioning of the roller 80 either in an extended position, in engagement with the conduit 12 or in a retracted position, spaced from conduit 12.

As seen in FIG. 10, when the roller 80 is in engagement with conduit 12, it urges the conduit into initial contact engagement with a surface 90 of insert 15.

In accordance with a preferred embodiment of the present invention, illustrated in FIG. 10, each insert 15 may be generally at rest at the time of initial contact with the inner surface of conduit 12. Initial contact with each insert is produced by a extension cycle of displacer assembly 84. The remainder of the apparatus and technique according to the embodiment of FIG. 10 may be identical to that described hereinabove.

It will be appreciated by persons skilled in the art that the present invention is not limited by what has been particularly shown and described hereinabove. Rather the scope of the invention is defined only by the claims which follow:

We claim:

1. A technique for manufacturing extruded drip irrigation lines including drip irrigation elements having a non-circular crosssection comprising the steps of:
   extruding a drip irrigation conduit; and
   heat welding discrete drip irrigation elements having a non-circular cross section to a portion of the interior surface of the drip irrigation conduit extending over less than the entire circumference thereof, the step of heat welding comprising the following steps;
   sequentially feeding discrete drip irrigation elements through the interior of the drip irrigation conduit;
   causing individual drip irrigation elements to establish initial contact with the extruded conduit when the extruded conduit has not yet reached its final cross sectional dimensions; and
   completing heat welding of the elements to the conduit when the conduit has substantially reached its final cross sectional dimensions.

2. A technique according to claim 1 and wherein said step of causing comprises the steps of:
   supplying gas under pressure to the interior of the extruded conduit, thereby causing expansion thereof;
   stretching the expanded extruded conduit to cause contraction thereof as initial heat welding contact is established between the drip irrigation element and the extruded conduit.

3. A technique for manufacturing extruded drip irrigation lines including drip irrigation elements having a non-circular cross section comprising the steps of:
   extruding a drip irrigation conduit; and
   heat welding discrete drip irrigation elements having a non-circular cross section to a portion of the interior surface of the drip irrigation conduit extending over less than the entire circumference thereof, the step of heat welding including the following steps:
   sequentially feeding discrete drip irrigation elements through the interior of the drip irrigation conduit; and
   causing individual drip irrigation elements to establish initial contact with the extruded conduit as the extruded conduit is undergoing linear motion at a first velocity substantially greater than the velocity of the individual drip irrigation element.

4. A technique according to claim 3 and also comprising the steps of pulling the drip irrigation element by means of the initial contact together with the conduit, and completing heat welding of the drip irrigation to the element.

5. A technique according to claim 3 and wherein the velocity of the drip irrigation element upon initial contact is at least 20% less than the first velocity.

6. A technique according to claim 3 and wherein the velocity of the drip irrigation element upon initial contact is at least 50% less than the first velocity.

7. A technique for manufacturing extruded drip irrigation lines including drip irrigation elements having a non-circular cross section comprising the steps of:
   extruding a drip irrigation conduit; and
   heat welding discrete drip irrigation elements having a non-circular cross section to a portion of the interior surface of the drip irrigation conduit extending over less than the entire circumference thereof, the step of heat welding comprising the following steps:
   sequentially feeding discrete drip irrigation elements through the interior of the drip irrigation conduit;
   causing individual drip irrigation elements to establish initial contact with the extruded conduit as the extruded conduit is being stretched to its final cross sectional dimensions, the velocity of the drip irrigation element upon initial contact being nearly zero; and
   completing heat welding of the elements to the conduit when the conduit has substantially reached its final cross sectional dimension.

8. A technique for manufacturing extruded drip irrigation lines inducing drip irrigation elements having a non-circular cross section including the steps of:
   extruding a drip irrigation conduit; and
   heat welding discrete drip irrigation elements having a non-circular cross section to a portion of the interior surface of the drip irrigation conduit extending over less than the entire circumference thereof, the steps of heat welding comprising the following steps:
   sequentially feeding discrete drip irrigation elements through the interior of the drip irrigation conduit; and
   causing individual drip irrigation elements to establish initial heat welding contact with the extruded conduit as the extruded conduit is undergoing linear motion at a first velocity which is less than the final velocity of the extruded conduit, said step of causing comprising moving a portion of the individual drip irrigation element with a component of motion transverse to the linear motion of the extruded conduit and into contact with an interior surface thereof.

9. A technique for manufacturing extruded drip irrigation lines including drip irrigation elements having a non-circular cross section comprising the steps of:
   extruding a drip irrigation conduit; and
   heat welding discrete drip irrigation elements having a non-circular cross section to a portion of the interior surface of the drip irrigation conduit extending over less than the entire circumference thereof, the step of heat welding including the following steps:

sequentially feeding discrete drip irrigation elements through the interior of the drip irrigation conduit; and intermittently pushing the extruded conduit at a first area with a component of motion transverse to the linear motion thereof into contact with the drip irrigation elements as the extruded conduit is undergoing linear motion at a velocity which is less than the final velocity of the extruded conduit.

10. A technique for manufacturing extruded drip irrigation lines including drip irrigation elements having a non-circular cross section including the steps of:

extruding a drip irrigation conduit; and heat welding discrete drip irrigation elements having a non-circular cross section to a portion of the interior surface of the drip irrigation conduit extending over less than the entire circumference thereof, the step of heat welding including the following steps sequentially feeding discrete drip irrigation elements through the interior of the drip irrigation conduit; and causing individual drip irrigation elements to establish initial contact with the extruded conduit while the extruded conduit has a linear velocity less than its final linear velocity.

11. Apparatus for manufacturing extruded drip irrigation lines including drip irrigation elements having a non-circular cross section comprising:

means for extruding a drip irrigation conduit; and means for heat welding discrete drip irrigation elements having a non-circular cross section to a portion of the interior surface of the drip irrigation conduit extending over less than the entire circumference thereof, the means for heat welding comprising:

means for sequentially feeding discrete drip irrigation elements through the interior of the drip irrigation conduit;

means for causing individual drip irrigation elements to establish initial contact with the extruded conduit when the extruded conduit has not yet reached its final cross sectional dimensions; and means for completing heat welding of the elements to the conduit when the conduit has substantially reached its final cross sectional dimensions.

12. Apparatus according to claim 11 and wherein said means for causing comprises:

means for supplying gas under pressure to the interior of the extruded conduit, thereby causing expansion thereof; and means for stretching the expanded extruded conduit to cause contraction thereof as initial heat welding contact is established between the drip irrigation element and the extruded conduit.

13. Apparatus according to claim 11 and wherein said means for heat welding comprise a series of rollers arranged to externally engage the conduit following initial heat welding contact thereof with the drip irrigation elements, for assisting in the completion of heat welding therebetween.

14. Apparatus according to claim 13 and wherein said series of rollers are arranged for engagement with said conduit within a liquid bath maintained at less than atmospheric pressure.

15. Apparatus according to claim 13 and also comprising at least one roller disposed for external engagement with the conduit upstream of said series of rollers, for ensuring alignment of the drip irrigation elements with the conduit.

16. Apparatus according to claim 13 and wherein said series of rollers is formed with a concave cross section arranged to correspond to the shape of the conduit and the drip irrigation elements, thereby to ensure complete heat welding therebetween.

17. Apparatus according to claim 13 and wherein said series of rollers is formed to define a straight engagement surface for engagement with the conduit.

18. Apparatus according to claim 11 and also comprising a roller externally engaging the conduit at a location just upstream of the location of initial contact between the conduit and the drip irrigation emitter.

19. Apparatus according to claim 11 and wherein said means for heat welding comprise a drip irrigation emitter unit support which is non-linear.

20. Apparatus according to claim 19 and wherein said emitter unit support includes an initial upward bend followed by a downward bend, both bends lying upstream of the location of initial contact between the conduit and the drip irrigation emitter.

21. Apparatus according to claim 11 and also comprising roller means for flattening the conduit following heat welding of drip irrigation emitters thereto.

22. Apparatus for manufacturing extruded drip irrigation lines including drip irrigation elements having a non-circular cross section comprising:

means for extruding a drip irrigation conduit;

means for heat welding discrete drip irrigation elements having a non-circular cross section to a portion of the interior surface of the drip irrigation conduit extending over less than the entire circumference thereof, the means for heat welding comprising:

means for sequentially feeding discrete drip irrigation elements through the interior of the drip irrigation conduit; and means for causing individual drip irrigation elements to establish initial contact with the external conduit as the extruded conduit is undergoing linear motion at a first velocity substantially greater than the velocity of the individual drip irrigation element.

23. Apparatus according to claim 22 and wherein the velocity of the drip irrigation element upon initial contact is at least 20% less than the first velocity.

24. Apparatus according to claim 22 and wherein the velocity of the drip irrigation element upon initial contact is at least 50% less than the first velocity.

25. Apparatus according to claim 22 and wherein the velocity of the drip irrigation element upon initial contact is nearly zero.

26. Apparatus for manufacturing extruded drip irrigation lines including drip irrigation elements having a non-circular cross section comprising:

means for extruding a drip irrigation conduit; and means for heat welding discrete drip irrigation elements having a non-circular cross section to a portion of the interior surface of the drip irrigation conduit extending over less than the entire circumference thereof, the means for heat welding including:

means for sequentially feeding discrete drip irrigation elements through the interior of the drip irrigation conduit; and means for causing individual drip irrigation elements to establish initial contact with the extruded conduit while the extruded conduit has a linear velocity less than its final linear velocity.

27. Apparatus for manufacturing extruded drip irrigation lines including drip irrigation elements having a non-circular cross section comprising:
- means for extruding a drip irrigation conduit; and
- means for heat welding discrete drip irrigation elements having a non-circular cross section to a portion of the interior surface of the drip irrigation conduit extending over less than the entire circumference thereof, the means for heat welding comprising:
- means for sequentially feeding discrete drip irrigation elements through the interior of the drip irrigation conduit;
- means for causing individual drip irrigation elements to establish initial heat welding contact with the extruded conduit as the extruded conduit is undergoing linear motion at a first velocity which is less than the final velocity of the extruded conduit, said step of causing comprising moving a portion of the individual drip irrigation element with a component of motion transverse to the linear motion of the extruded conduit and into contact with an interior surface thereof.

28. Apparatus for manufacturing extruded drip irrigation lines including drip irrigation elements having a non-circular cross section comprising:
- means for extruding a drip irrigation conduit; and
- means for heat welding discrete drip irrigation elements having a non-circular cross section to a portion of the interior surface of the drip irrigation conduit extending over less than the entire circumference thereof, the means for heat welding comprising:
- means for sequentially feeding discrete drip irrigation elements through the interior of the drip irrigation conduit; and
- means for intermittently pushing the extruded conduit at a first area with a component of motion transverse to the linear motion thereof into contact with the drip irrigation elements as the extruded conduit is undergoing linear motion at a velocity which is less than the final velocity of the extruded conduit.

* * * * *